United States Patent [19]

Osanai

[11] 4,283,095
[45] Aug. 11, 1981

[54] CAPSTAN SHAFT THRUST PAD DEVICE

[75] Inventor: Akira Osanai, Hachioji, Japan

[73] Assignee: Olympus Optical Company Limited, Tokyo, Japan

[21] Appl. No.: 21,189

[22] Filed: Mar. 16, 1979

[30] Foreign Application Priority Data

Mar. 17, 1978 [JP] Japan .................................. 53-30839

[51] Int. Cl.³ ...................... F16C 17/04; B65H 17/02
[52] U.S. Cl. .................................. 308/139; 308/161; 226/194; 360/96.3
[58] Field of Search ............... 308/135, 139, 158, 161, 308/162; 226/188, 190, 194; 360/96.3, 96.4

[56] References Cited

U.S. PATENT DOCUMENTS

| 3,877,074 | 4/1975 | Güttinger | 360/96.3 |
| 4,067,488 | 1/1978 | Cicatelli | 226/194 |
| 4,136,366 | 1/1979 | Ogiro et al. | 360/96.4 |

FOREIGN PATENT DOCUMENTS 2541002  3/1976  Fed. Rep. of Germany .......... 360/96.4

Primary Examiner—Richard R. Stearns

[57] ABSTRACT

A capstan shaft thrust pad device, for use with a tape cassette having a capstan shaft opening of a certain diameter, includes a bearing having a generally cylindrical upper portion which forms a first bearing surface, the outer diameter of the upper bearing portion being less than the diameter of the capstan shaft opening, and a lower bearing portion forming a second bearing surface parallel to the first bearing surface. A capstan shaft is supported by the bearing for rotation about the shaft axis, the shaft extending through the bearing, perpendicular to the first and second bearing surfaces. A fly wheel is coaxially fixed to the capstan shaft beyond the second bearing surface and the fly wheel has an end surface facing the second bearing surface so as to prevent axial movement of the shaft in one direction. A generally C-shaped thrust pad member is fixed in a groove on the capstan shaft beyond the second bearing surface to prevent axial movement of the shaft in the other axial direction. The thrust pad member extends radially from the shaft by an amount less than the outer diameter of the upper bearing portion. Accordingly, the thrust pad member is receivable in the capstan shaft opening in the tape cassette, together with the upper bearing portion and the capstan shaft. Moreover, since the thrust pad member is received in the tape cassette, the body of a tape cassette player or recorder in which the device is employed can be formed relatively thin.

2 Claims, 3 Drawing Figures

FIG.1 PRIOR ART
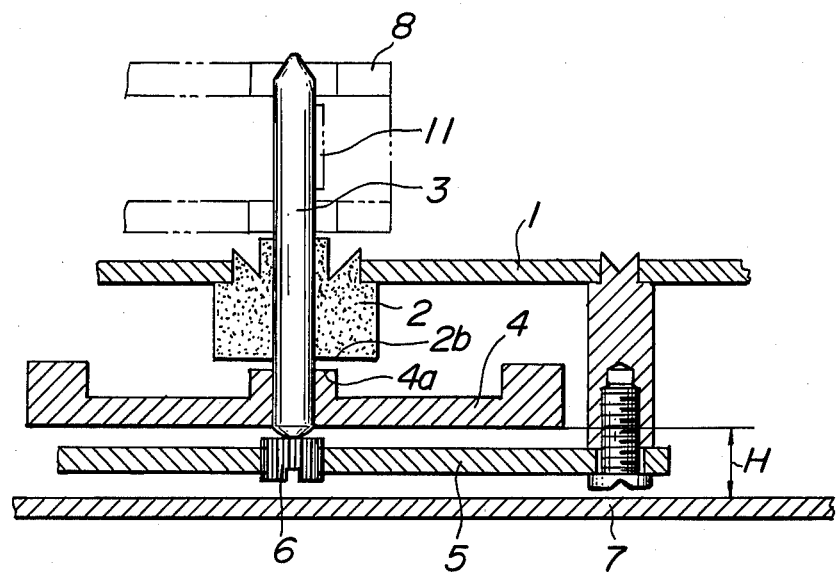
FIG.2
FIG.3
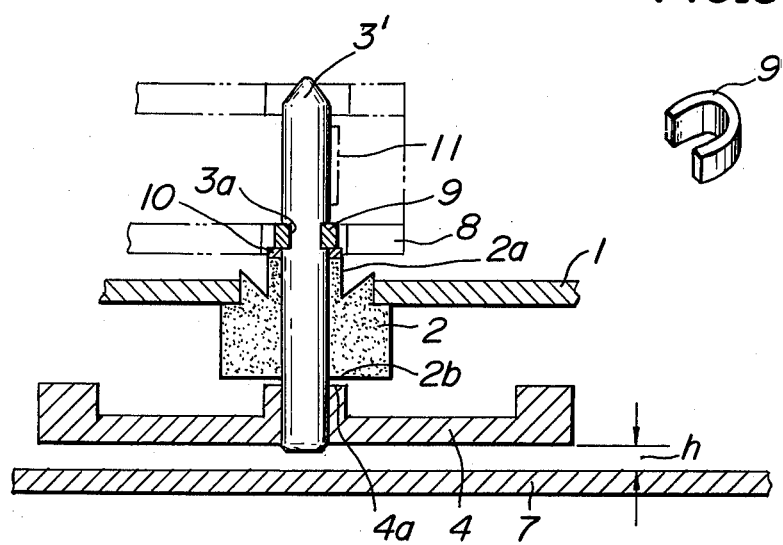

CAPSTAN SHAFT THRUST PAD DEVICE

BACKGROUND OF THE INVENTION

The present invention relates to a capstan shaft thrust pad device which enables a cassette tape recorder to be constructed with an ultra-thin profile.

In general, in a capstan drive system cassette tape recorder, a fly wheel is integrally provided with a capstan shaft for the purpose of stabilizing rotation of the capstan shaft and driving the capstan shaft by a drive motor through the fly wheel.

In this case, a known thrust pad device for the capstan shaft, is shown in FIG. 1. To a main chassis 1 is fixedly secured a capstan bearing 2, and a thrust pad for preventing upward movement of the shaft includes an upper end surface 4a of a fly wheel 4, which is force fitted onto a capstan shaft 3, and a lower end surface 2b of the bearing 2.

On the other hand, a thrust pad for preventing downward movement of the capstan shaft includes a thrust pad member 6 adjustably mounted in a base plate 5.

In such thrust pad device, the base plate 5 is required, so that the distance H from the lower end of the fly wheel 4 to a main casing 7 becomes large. This hinders manufacture of the tape recorder with a thin profile. Also, the number of required parts is increased and the recorder weight becomes heavy.

SUMMARY OF THE INVENTION

An object of the present invention is to eliminate the above disadvantages of the conventional capstan shaft thrust pad device.

Another object of the invention is to provide a capstan shaft thrust pad device by extending one of the thrust pads for the capstan shaft into a cassette, so that the shaft length of the capstan shaft is as long as possible within a thin tape recorder which is light in weight.

According to the present invention a capstan shaft thrust pad device comprises a capstan shaft and thrust pad members provided at both ends thereof. One thrust pad member on the capstan shaft is arranged to extend a tape cassette.

BRIEF DESCRIPTION OF THE DRAWINGS

FIG. 1 is a cross-sectional view showing a conventional capstan shaft thrust pad device;

FIG. 2 is a cross-sectional view showing one embodiment of a capstan shaft thrust pad device according to the present invention; and FIG. 3 is a perspective view showing a thrust pad member used in the embodiment shown in FIG. 2.

DESCRIPTION OF THE PREFERRED EMBODIMENT

FIG. 2. shows one embodiment of a capstan shaft thrust pad device according to the present invention. In FIG. 2, a bearing 2 of an oilless metal or the like is firmly secured to a main chassis 1. A capstan shaft 3' is inserted in the bearing 2, and a fly wheel 4 is force fitted on the shaft. A groove 3a is bored in the capstan shaft 3', and a thrust pad member 9 is fitted in groove 3a so that a thrust pad device is thus constructed.

That is, a slight gap is formed between a lower end surface 2b of the bearing 2 and an upper end surface 4a of the fly wheel 4 so as to form a thrust pad to prevent upward movement of the shaft 3'. A thrust pad for preventing downward movement of the shaft 3' is formed by mounting the C-shaped thrust pad member 9, as shown in FIG. 3, in the peripheral groove 3a bored on the capstan shaft 3 and providing a lubricating washer 10 on the shaft between the pad member 9 and the bearing 2.

Therefore, the thrust pad member 9 and the bearing 2 serve to maintain a slight spacing between; the bearing 2 and the fly wheel 4. With the washer 10 between the pad member 9 and the bearing 2, the fly wheel 4 can rotate with a minimum degree of friction.

In this case, the thrust pad member 9 projects slightly radially from the capstan shaft 3, so that even if the thrust pad member 9 is inserted into a tape cassette 8, there is no interference since the lubricating washer 10 and the thrust pad member 9 are provided, as a result, even if oil leaks from the bearing 2 of oilless metal during rotation, no oil adheres to a tape 11 inside the cassette.

With such construction, the distance h between the fly wheel and the main casing can be made very short and the tape recorder body can be made thin. Also, the body can be formed to be thin, since the capstan bearing member extends at 2a into the tape cassette, and the capstan shaft length is shortened accordingly.

In addition, the present invention is not limited to the above embodiment but can be modified within the range where the thrust pad member and the bearing can perform their functions.

As described above, the present invention aims to extend one of the thrust pad members into the cassette for the purpose of making the tape recorder thin. The present invention can provide a capstan shaft thrust pad device for a tape recorder without loss of performance but nevertheless reducing a number of parts, simplifying its construction and allowing its body to be relatively thin.

What is claimed is:

1. A capstan shaft thrust pad device for use with a tape cassette having a capstan shaft opening of a certain diameter, comprising a bearing including a generally cylindrical upper bearing portion which forms a first bearing surface, the outer diameter of said upper bearing portion being less than the diameter of the capstan shaft opening so that said upper bearing portion is receivable in the capstan shaft opening, and a lower bearing portion which forms a second bearing surface which is parallel to said first bearing surface, a capstan shaft supported by said bearing for rotation about the axis of said capstan shaft, said capstan shaft extending perpendicular to and beyond said first and said second bearing surfaces in the axial direction of said capstan shaft, a flywheel coaxially fixed to said capstan shaft beyond said second bearing surface, said flywheel having an end surface facing said second bearing surface to prevent axial movement of said capstan shaft in the direction of said lower bearing portion toward said upper bearing portion, and a thrust pad member fixed on said capstan shaft beyond said first bearing surface for preventing axial movement of said capstan shaft in the direction from said upper bearing portion toward said lower bearing portion, said thrust pad member extending radially from said capstan shaft by an amount less than the outer diameter of said upper bearing portion so that said thrust pad member can be received in the capstan shaft opening in the tape cassette together with said upper bearing portion and said capstan shaft.

2. A capstan shaft thrust pad device according to claim 1, wherein said capstan shaft has a groove cut in its outer periphery transversely of the axis of said capstan shaft, and said thrust pad member is generally C-shaped and is mounted in said groove.

* * * * *